July 1, 1969  K. R. A. WILSON  3,452,951
HIGH DRAG EFFICIENCY PARACHUTE CANOPY
Filed March 17, 1967  Sheet 1 of 4
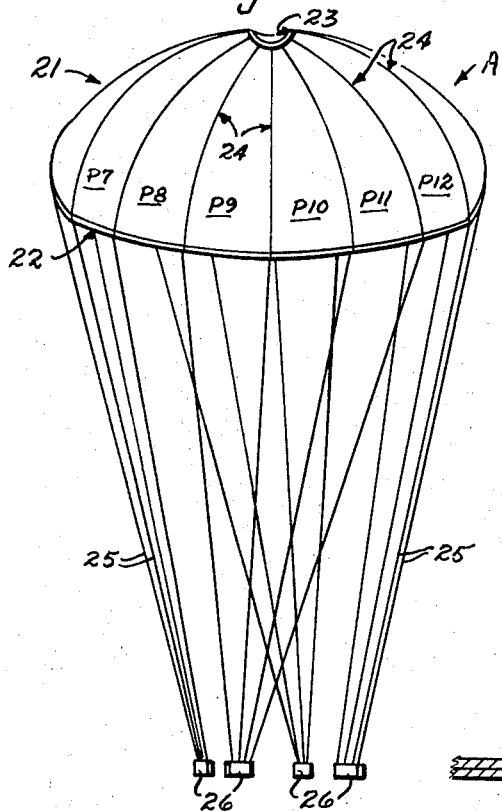
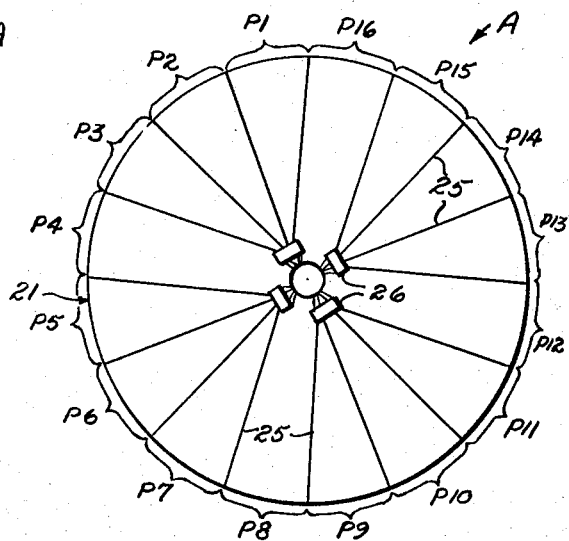
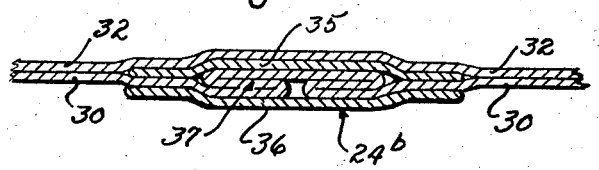
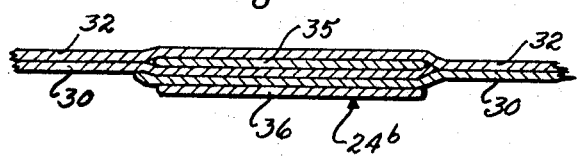
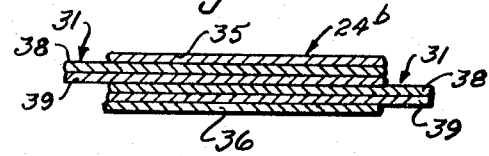
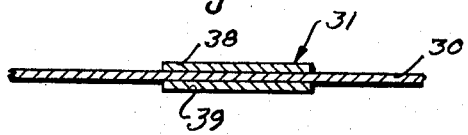
INVENTOR
KENNETH R. A. WILSON
BY
ATTORNEYS July 1, 1969     K. R. A. WILSON     3,452,951
HIGH DRAG EFFICIENCY PARACHUTE CANOPY
Filed March 17, 1967     Sheet 2 of 4
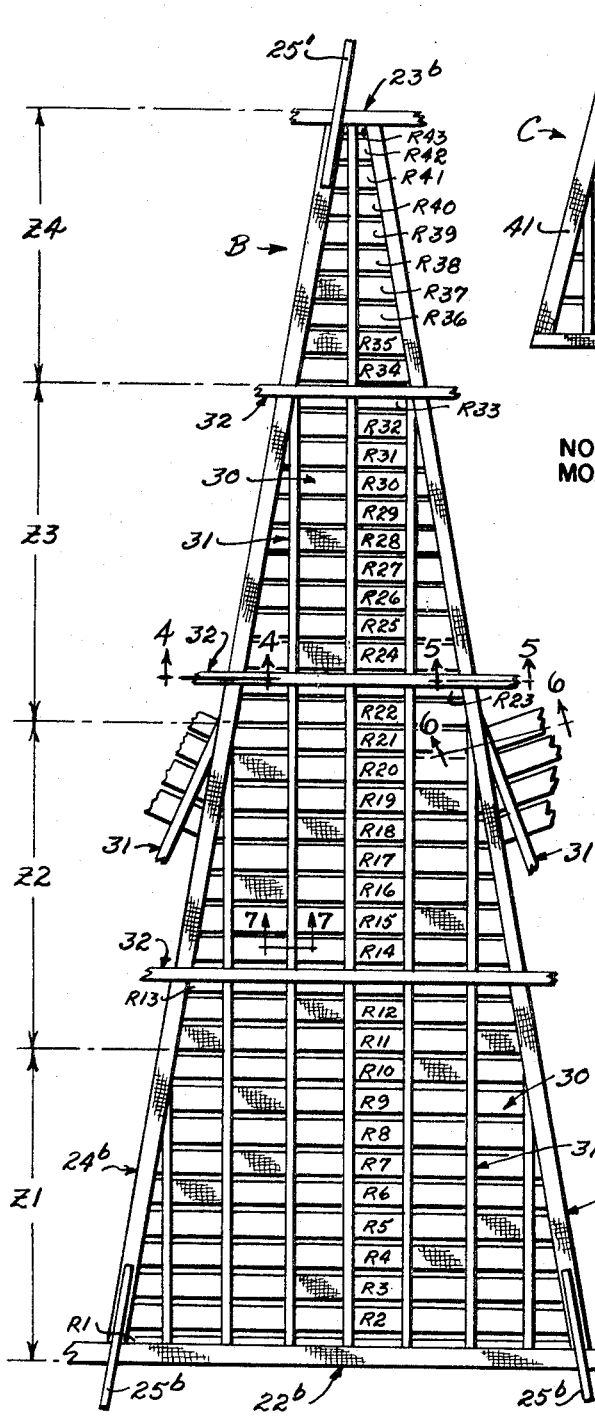
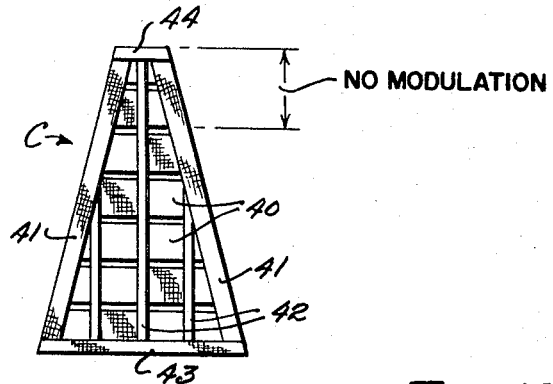
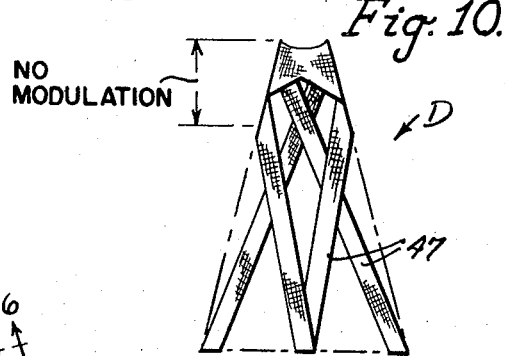
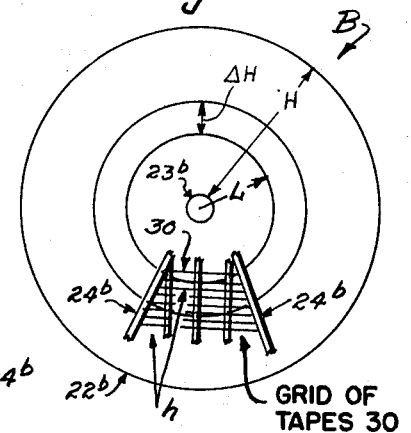
INVENTOR
KENNETH R. A. WILSON

+ — FORM E
⊙ — FORM F
△ — FORM G

INVENTOR
KENNETH R. A. WILSON

BY
ATTORNEYS

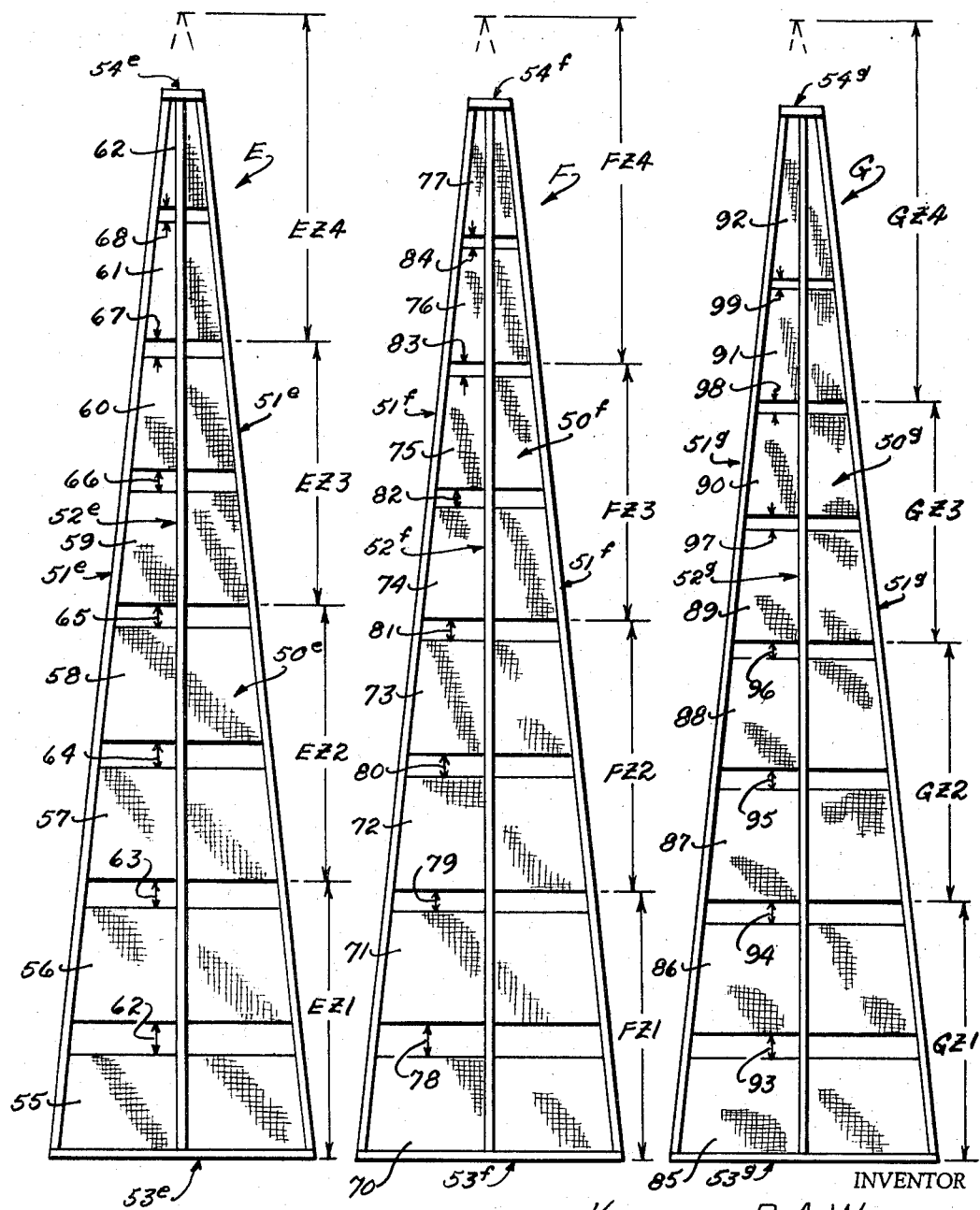

United States Patent Office 3,452,951
Patented July 1, 1969

3,452,951
HIGH DRAG EFFICIENCY PARACHUTE CANOPY
Kenneth R. A. Wilson, Glendale, Calif., assignor to Irvin Industries Inc., Lexington, Ky., a corporation of New York
Filed Mar. 17, 1967, Ser. No. 623,923
Int. Cl. B64d 17/02
U.S. Cl. 244—145       3 Claims

ABSTRACT OF THE DISCLOSURE

A high drag efficiency parachute canopy having a plurality of concentric horizontal members comprising the main drag generators thereof, the horizontal members being modulated to provide zones of decreasing local porosity from skirt to apex of the canopy.

---

Present day parachutes fall into two general categories:

(1) Parachutes of the ribbon and ring slot type which are able to successfully withstand the effects of high velocities and dynamic pressures by virtue of their relatively low effective drag efficiency; and (2) Parachutes of the flat circular extended skirt, scalloped skirt, solid conical, hemispherical and triangular type which have a more favorable effective drag efficiency, but are severely limited in their ability to operate at and withstand high velocities and dynamic pressures.

Thus, the present state of the art fails to provide a parachute which has the ability to withstand high velocity and impact pressures while providing high drag efficiency stability and minimum weight and bulk. This type of parachute is desirable, for instance, in the matter of orbital vehicle recovery after reentry into earth's atmosphere, as well as innumerable suborbital recovery vehicle applications.

The primary object of this invention is the provision of a parachute which has the ability to withstand high velocity and impact pressures while providing high drag efficiency stability and minimum weight and bulk.

A further object is the provision of a parachute which will be capable of withstanding, either in a reefed or unreefed shape, supersonic velocities and impact pressures while at the same time providing greatly improved drag efficiency, low limits of oscillation, lower deployment forces and relatively low weight and bulk.

A further object is the provision of a high drag efficiency parachute which is able to withstand the effects of high velocities and dynamic pressures and in which there is no restriction on the placement of the necessary lateral, vertical, radial, or diagonal structural reinforcement members.

A further object is the provision of a high drag efficiency parachute which is not restricted to a particular envelope shape but will readily adapt itself to a large variety of parachute compartment shapes and configurations.

A further object is the provision of a high drag efficiency parachute which is not restricted to any particular total drag area, diameter or canopy shape.

A further object is the provision of a high drag efficiency parachute which, in canopy design and manufacturing costs, will be comparable to presently used types.

Other objects and advantages of the invention will become apparent during the course of the following detailed description, taken in connection with the accompanying drawings, forming a portion of this specification, and in which drawings:

FIG. 1 is a somewhat diagrammatic view of a parachute which may include my improved canopy.

FIG. 2 is a bottom plan view of the parachute of FIG. 1.

FIG. 3 is an enlarged fragmentary top plan view of a portion of a ribbon type canopy according to my invention and which may comprise the canopy of the parachute shown in FIG. 1.

FIG. 4 is an enlarged sectional view taken substantially along the line 4—4 of FIG. 3.

FIG. 5 is an enlarged transverse sectional view taken substantially along the line 5—5 of FIG. 3.

FIG. 6 is an enlarged sectional view taken substantially along the line 6—6 of FIG. 3.

FIG. 7 is an enlarged sectional view taken substantially along the line 7—7 of FIG. 3.

FIG. 8 is a diagrammatic top plan view of the canopy of FIG. 3.

FIG. 9 is a top plan view of a gore of a conventional ribbon parachute.

FIG. 10 is a fragmentary top plan view of another type of ribbon parachute.

FIGS. 13, 14 and 15 are top plan views of various forms of gores of various types of ring-slot parachutes constructed according to the present invention and which may comprise the canopy shown in FIG. 1.

Figure 11:
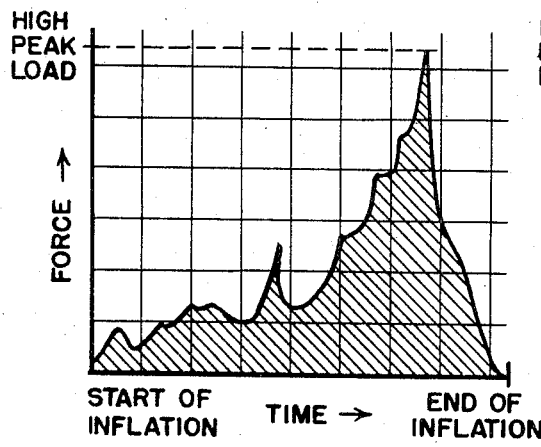
FIG. 11 is a graph showing the variable load at inflation of a conventional ribbon canopy.

In the drawings, wherein for the purposes of illustration are shown preferred and modified embodiments of the invention, and wherein similar reference characters designate corresponding parts throughout the several views, the letter A may generally designate a parachute constructed according to the present invention, as shown in FIGS. 1 and 2; B a ribbon type canopy constructed according to the present invention, as shown in FIGS. 3–8; C a conventional ribbon canopy as shown in FIG. 9; D a ribbon canopy as shown in FIG. 10; E the ring-slot canopy as shown in FIG. 13; F the ring-slot canopy as shown in FIG. 14; and G the ring-slot canopy as shown in FIG. 15.

Referring to FIGS. 1 and 2, parachute A includes a canopy 21 comprising a plurality of panels or gores P1–P16, skirt 22, and a vent 23 at the apex thereof, and having radial members 24 extending intermediate the gores from skirt 22 to vent 23. A plurality of suspension lines 25 may be interconnected to canopy 21 in the usual manner, suspension lines 25 having cargo or personnel supporting members 26 at their lowermast ends. The various elements are sewn together in the usual manner, as is well known in the art.

The showing of FIG. 3 comprises a gore of a ribbon type canopy constructed according to my invention and may be an embodiment of panel or gore P8. The other panels or gores of parachute A having such an embodiment will be proportioned similar to P8, as will be readily understood by those skilled in the art.

Canopy B is a flat circular ribbon type canopy having concentric ribbons 30 and radial members 24[b] which transmit the loads to suspension lines 25[b]. Vent lines 25' may be provided across the vent 23[b], as is well known in the art. As in the conventional flat circular canopy, the gores of a flat circular ribbon canopy are constructed as flat triangles. As shown for the embodiment of gore P8 in FIG. 3, such gores preferably consist of wide horizontal ribbons 30 running parallel to the skirt 22$^b$, narrow vertical tapes 31 sewed perpendicular to skirt 22$^b$, and lateral tapes 32. Horizontal ribbons 30 are the main drag generators; narrow vertical tapes 31 serving to space and control the horizontal ribbons 30; and lateral tapes 32 adding structural reinforcement.

As shown in FIGS. 4–6 each radial member 24$^b$ preferably comprises an outer radial ribbon 35 and an inner radial ribbon 36.

FIG. 4 shows a typical section through radial member 24$^b$ between all gores except that between gores P1, P16 and P8, P9. This figure also shows attachment of a lateral tape 32 to a horizontal ribbon 30.

FIG. 5 shows a typical section through radial members 24$^b$ between gores P1, P16 and P8, P9.

Canopy B is shown as constructed in two segments, one section including gores P1–P8 and the other section including gores P9–P16. Horizontal ribbons 30 are preferably continuous through each section, being folded as at 37 (see FIG. 4) to accommodate the angular positioning of the gores. The ends of horizontal ribbons 30 are interconnected as shown in FIG. 5 in joining together of the segments to complete the canopy.

As shown in FIGS. 6 and 7, vertical tapes 31 each preferably comprise an outer tape 38 and an inner tape 39. Horizontal ribbons 30 are sewn between tapes 38 and 39 as shown in FIG. 7; and the upper ends of a vertical tape 31 of one gore may be attached to the upper end of a vertical tape of an adjacent gore, both being attached to a radial member 24$^b$, as shown in FIG. 6. Of course, the invention is not limited to a flat circular canopy, but is readily adaptable to other canopy forms and shapes. My improved canopy is designed to have desired local porosity at any small element of area. That is, the porosity progressively decreases from skirt to vent. In connection with a ribbon type parachute according to my invention, this is preferably accomplished by breaking down the radial length of each gore into zones Z1, Z2, Z3 and Z4, as shown in FIG. 3. Ribbon arrangement in each of these zones may be as follows:

Z1—In this zone, there may be deployed spaced horizontal ribbons R1–R10. That is, 10 ribbons of 2 inch width, 300 lb. tensile strength nylon tape of Class C, Mil-T-5608 and 10 spaces of .60 inch.

Z2—In this zone, there may be deployed spaced horizontal ribbons R11–R21. That is, 11 ribbons of 2 inch width, 300 lb. tensile strength nylon tape of Class C, Mil-T-5608 and 11 spaces of .50 inch.

Z3—In this zone, there may be deployed spaced horizontal ribbons R22–R33. That is, 12 ribbons of 2 inch width, 460 lb. tensile strength, nylon tape of Class D, Mil-T-5608 and 11 spaces of .40 inch.

Z4—In this zone there may be deployed spaced horizontal ribbons R34–R43. That is, 10 ribbons of 2 inch width, 1000 lb. tensile strength nylon tape of Class E, Mil-T-5608 and 10 spaces of .30 inch.

It will thus be observed that the local porosity of a canopy constructed according to this invention decreases in both mechanical and geometrical porosity from skirt to vent. The term "local porosity" is used to describe a particular value of porosity in a given area of the parachute. Of course, the invention is not limited to the number of ribbons in each zone, the mechanical porosity of the ribbons, or the geometrical porosity obtained by spacing of the ribbons, as given above, the same being merely illustrative of the construction of a ribbon type canopy according to the present invention.

Expressing the concept of the present invention in mathematical terms:

The characteristics of all ribbon parachutes depend on the average total porosity, as well as on the distribution of this porosity along the surface (local porosity). These porosities can be expressed as follows:

Average total porosity $\lambda = h/H$
Local porosity $\lambda_L = \Delta h / \Delta H$ $h$ = open area in the parachute, including openings (geometric porosity) and small interstices between the weave elements of a porous material (mechanical porosity).
$H$ = nominal radius of canopy (gore height along radial)
$\Delta H$ = individual zone height
$\Delta h$ = open area in design area $\Delta H$
$L$ = distance of $\Delta H$ from top of gore.

These terms are presented and illustrated in FIG. 8.

In many applications, it is desirable to modulate local porosity $\lambda_L$ while holding total porosity $\lambda$ constant for a given size ribbon parachute. In such a construction, the advantages will be:

(1) An increased drag area during steady state descent of a parachute, which will permit the use of a smaller, hence more economical and less bulky parachute for a given application; and (2) Minimizing opening shock (peak load during inflation of canopy) which will again permit the use of a less bulky parachute.

It is easily seen that, in order to make use of the advantages, the designer of the parachute must have full freedom of modulating local porosity $\lambda_L$ while all other parameters remain the same. Previously, the only consideration has been with respect to average total porosity $\lambda$, whereas local porosity $\lambda_L$ has not been considered.

FIG. 9 shows a gore of a conventional ribbon parachute. This gore is for a conventional flat circular canopy, the gores being constructed as flat triangles and including horizontal ribbons 40, radial ribbons 41, and vertical tapes 42. Each gore may also be provided with skirt reinforcement 43 and vent reinforcements 44, as well as other conventional structural reinforcements. In the conventional ribbon canopy C, the width of horizontal ribbons 40 is generally two inches for canopies with nominal diameters larger than four feet, all of the ribbons being of the same width and of the same mechanical porosity. The number of horizontal ribbons is determined by the ribbon width and the geometric porosity.

In a conventional ribbon canopy, the number of radial ribbons 41 is basically determined by the size and structural requirements of the canopy and this factor, coupled with the uniform spacing of uniform tapes creates an area at the top of the parachute in which no modulation is possible.

Using the mathematical indicia previously referred to the local porosity of both the conventional ribbon canopy and the ribbon canopy of the present invention may be expressed as:

$$\lambda_L = \lambda_L(L)$$

However, for conventional ribbon canopies, the local porosity at any point of the distance L is a built-in function of the canopy structure and the dimension L. In my improved construction, this local porosity can be freely selected by varying geometrical porosity and/or mechanical porosity at the desired distance L. Thus, in the conventional ribbon parachute canopy, no regulation or modulation of porosity is provided for at a given distance L.

I recognize that certain other persons have endeavored to provide a parachute canopy having decreasing porosity from skirt to vent. This has allegedly been accomplished by various spacings of radial tapes 47, as diagrammatically illustrated in canopy D of FIG. 10. Examples of this type of construction are those of the following U.S. patents: 2,500,170, Fogal, Mar. 14, 1950; 2,520,533, Dawes, Aug. 29, 1950; 2,952,429, Kostelezky, Sept. 13, 1960.

However, here again, the local porosity at any point of the distance L is a built-in function of the canopy structure. Furthermore, as shown in FIG. 10, at the top of the canopy, where all of the various radial tapes merge, no modulation is possible. In certain instances, this virtually impervious crown area may lead to high snatch/opening loads, whereas the concept of the present invention has demonstrated very low snatch/opening loads.

Furthermore, the number of radial tapes required is usually determined by the structural requirements of the parachute, including the load to be supported by the same. In the use of a ribbon canopy, it is very easy to see that the number of radial ribbons 47 required for producing the desired total average porosity might not be sufficient to support the load, which would result in rupture of some of the radial tapes 47. If, however, you add sufficient radial tapes to sustain the load, the total average porosity is decreased below that which may be desired. This canopy D design is thus largely impractical for the varied requirements of today's parachutes. Conversely, ribbon parachute canopy construction according to the present invention permits free selection of the local porosity at any point of the distance L and is not a built-in function of the canopy structure.

Figure 12:
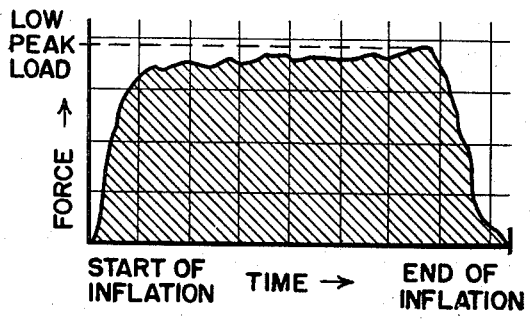
FIG. 12 is a graph showing the near constant load at inflation of a ribbon canopy constructed according to the present invention.

FIG. 11 is a graph showing the variable load and inflation of a conventional ribbon canopy. FIG. 12 is a graph showing the near constant load and inflation of a ribbon canopy constructed according to the present invention. Comparing these graphs, it will be seen that, in contrast to the conventional ribbon canopy, the horizontal ribbon-porosity regulating canopy of the present invention can be designed to absorb a maximum of energy at lower inflation force. Specifically, the porosity can be re-distributed to make the opening force v. the time function ordinarily a "square function," thus increasing the energy absorption potential of the parachute, while hold down the peak force values the parachute has to encounter during inflation. This is obtained by increasing porosity in the skirt area and decreasing it in the crown area by an exactly calculated amount, allowing a much greater outflow of air in the lower portion of the canopy during inflation.

Forms E, F and G of the invention, as respectively shown in FIGS. 13, 14 and 15 are illustrations of gores of ring-slot canopies according to the present invention. The drag producing surface of such ring-slot canopy each respectively consist of polygonal cloth rings 50e, 50f, and 50g joined together by radial tapes 51e, 51f, and 51g and vertical tapes 52e, 52f, and 52g to provide open spaces or slots between the rings. The gores may include conventional skirt reinforcements 53e, 53f and 53g, and vent reinforcements 54e, 54f, and 54g.

The prior art in connection with ring-slot canopies teaches that rings of uniform height and porosity should be equally spaced between the vent and skirt to produce satisfactory results. In contradistinction to this showing of the prior art, I propose to use rings of decreasing mechanical porosity from skirt to vent and to space the same for decreasing geometric porosity from skirt to vent.

FIGS. 13, 14 and 15 are illustrative of different variations in mechanical and geometric porosity, and the invention is not limited to such forms alone.

Referring to form E:

Rings 55 and 56 are 0.85 ounce material having an air flow mechanical porosity of approximately 231.18 cubic feet per minute per square foot. Rings 57, 58, 59, 60, 61 and 62 are 1.1 ounce material having an average air flow mechanical porosity of 100.0 cubic feet per minute per square foot.

Ring 55 has a lower width of 44.38 inches, an upper width of 40.56 and is 16.0 inches in height; ring 56 has a lower width of 39.31 inches, an upper width of 35.01 inches, and is 18.0 inches in height; ring 57 has a lower width of 33.82 inches, an upper width of 29.53 inches, and a height of 18.00 inches; ring 58 has a lower width of 28.40 inches, an upper width of 24.10 inches, and a height of 18.00 inches; ring 59 has a lower width of 23.02 inches, an upper width of 18.73 inches, and a height of 18.00 inches; ring 60 has a lower width of 17.72 inches, an upper width of 13.42 inches, and a height of 18.00 inches; ring 61 has a lower width of 12.47 inches, an upper width of 8.17 inches, and a height of 18.00 inches; and ring 62 has a lower width of 7.34 inches, an upper width of 3.10 inches, and a height of 17.72 inches.

Space 62 is 5.25 inches; space 63 is 5.00 inches; space 64 is 4.75 inches; space 65 is 4.50 inches; space 66 is 4.25 inches; space 67 is 4.00 inches; and space 68 is 3.50 inches.

Breaking down this gore into four zones of porosity, zones EZ1, EZ2, EZ3, and EZ4, zone EZ4 including 1/24 of the vent opening, the local porosity with respect to the various zones of the gore are:

|  | Percent |
| --- | --- |
| EZ1 | 26.25 |
| EZ2 | 20.06 |
| EZ3 | 16.89 |
| EZ4 | 15.00 |
| Total average porosity | 21.75 |

Referring to form F:

Rings 70, 71 and 72 are 0.85 ounce material having an air flow mechanical porosity of approximately 231.18 cubic feet per minute per square foot. Rings 73, 74, 75, 76 and 77 are 1.1 ounce material having an average air flow mechanical porosity of 100.0 cubic feet per minute per square foot.

Ring 70 has a lower width of 44.38 inches, an upper width of 40.56 inches, and a height of 16.00 inches; ring 71 has a lower width of 39.31 inches, an upper width of 35.01 inches and a height of 18.00 inches; ring 72 has a lower width of 33.88 inches, an upper width of 29.59 inches and a height of 18.00 inches; ring 73 has a lower width of 28.51 inches, an upper width of 24.22 inches, and a height of 18.00 inches; ring 74 has a lower width of 23.20 inches, an upper width of 18.90 inches, and a height of 18.00 inches; ring 75 has a lower width of 17.95 inches, an upper width of 13.66 inches, and a height of 18.00 inches; ring 76 has a lower width of 12.76 inches, an upper width of 8.47 inches, and is 18.00 inches in height; and ring 77 has a lower width of 7.63 inches, and upper width of 3.10 inches and a height of 18.97 inches.

Space 78 is 5.25 inches; space 79 is 4.75 inches; space 80 is 4.50 inches; space 81 is 4.25 inches; space 82 is 4.00 inches; space 83 is 3.75 inches; and space 84 is 3.50 inches.

Breaking down this gore into four zones of porosity, zones FZ1, FZ2, FZ3, and FZ4, zone FZ4 including 1/24 of the vent opening, the local porosity with respect to the various zones of the gore are:

|  | Percent |
| --- | --- |
| FZ1 | 26.11 |
| FZ2 | 21.31 |
| FZ3 | 17.02 |
| FZ4 | 15.28 |
| Total average porosity | 21.75 |

It will be noted that forms E and F, while having the same total average porosity, have different local porosities. The local porosities of this type of panel can thus be varied radically according to specific applications.

Referring to form G:

Rings 85, 86 and 87 are 0.85 ounce material having an air flow mechanical porosity of approximately 231.18 cubic feet per minute per square foot. Rings 88, 89, 90, 91 and 92 are 1.1 ounce material having an average air flow mechanical porosity of 100.0 cubic feet per minute per cubic foot.

Ring 85 has a lower width of 44.38 inches, an upper width of 40.56 inches and a height of 16.00 inches; ring 86 has a lower width of 39.43 inches, an upper width of 35.13 inches and a height of 18.00 inches; ring 87 has a lower width of 34.12 inches, an upper width of 29.83 inches, and a height of 18.00 inches; ring 88 has a lower width of 28.87 inches, an upper width of 24.58 inches and a height of 18.00 inches; ring 89 has a lower width of 23.68 inches, an upper width of 19.39 inches, and a height of 18.00 inches; ring 90 has a lower width of 18.55 inches, an upper width of 14.26 inches, and a height of 18.00 inches; ring 91 has a lower width of 13.49 inches, an upper width of 9.12 inches, and a height of 18.00 inches; and ring 92 has a lower width of 8.47 inches, an upper width of 2.39 inches, and a height of 25.47 inches.

Space 93 is 4.75 inches; space 94 is 4.25 inches; space 95 is 4.00 inches; space 96 is 3.75 inches; space 97 is 3.50 inches; space 98 is 3.25 inches; and space 99 is 3.00 inches.

Breaking down this gore into four zones of porosity, zones GZ1, GZ2, GZ3, and GZ4, zone GZ4 including $\frac{1}{2}$ of the vent opening, the local porosity with respect to the various zones of the gore are:

|     | Percent |
| --- | --- |
| GZ1 | 24.66 |
| GZ2 | 20.11 |
| GZ3 | 15.64 |
| GZ4 | 11.67 |
| Total average porosity | 19.75 |

Figure 16:
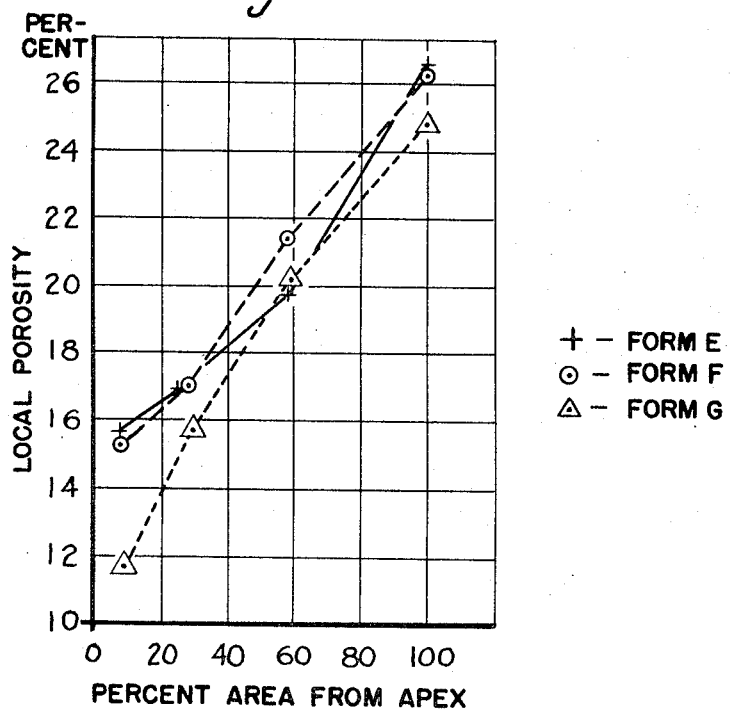
FIG. 16 is a graph showing the linear increase of porosity from vent to skirt in the forms of ring-slot parachute canopies using gores as shown in FIGS. 13, 14 and 15.

FIG. 16 is a graph showing the different local porosity that may be respectively attained with forms E, F and G. This graphically presents a showing that the local porosity of ring-slot canopies according to this invention decreases linearly from skirt to vent.

The theory behind my improved invention is apparent from the foregoing. In a presently designed parachute, because it has standard space or slot width throughout the canopy regardless of canopy type, the conventional canopy produces an actual reversal of the local porosities shown and described in this disclosure, i.e., the actual effective porosity of the conventional canopy is very high in the vent area when related to cloth area and very low in the skirt area when related to cloth area. The basic law of aerodynamic drag shows this to be an inefficient configuration. My invention permits the maximum effective drag area to be located in the crown of the canopy where, aerodynamically it is the most efficient.

In summary, my improved ribbon canopy and ring-slot canopy is a regulated local porosity canopy which, by its design, provides less initial opening force, more drag per unit area during steady descent stage, and will have less weight and greater strength than a conventional ribbon type or ring-slot canopy under identical deployment conditions. The basic principle is the specific distribution of local porosity in the canopy whereby the total drag area can be "shifted" in specific zone areas to effect the desired drag coefficient.

I claim:

1. A ribbon parachute canopy having a plurality of spaced apart concentric horizontal ribbons comprising the main drag generators thereof and a plurality of radial members interconnecting and supporting the same, said horizontal ribbons being spaced apart in zones of geometric porosity decreasing from adjacent the skirt thereof to adjacent the apex thereof, certain of said horizontal ribbons having a mechanical porosity greater than others, and said horizontal ribbons being disposed in zones of decreasing mechanical porosity from adjacent the skirt thereof to adjacent the apex thereof, whereby to provide a canopy having zones of local porosity which are a continuous function of the radial distance thereof from the apex of said canopy and such zones are of decreasing local porosity from the skirt of said canopy to the apex thereof.

2. A ring-slot parachute canopy having a plurality of polygonal cloth sections comprising the rings of said canopy and providing the main drag generators thereof, said polgonal cloth sections being spaced apart to provide the slots of said canopy, and a plurality of radial tapes interconnecting said cloth sections, certain of said slots being wider than others to provide zones of geometric porosity decreasing from adjacent the skirt thereof to adjacent the apex thereof, and certain of said cloth sections having a mechanical porosity greater than others and being disposed in zones of decreasing mechanical porosity from adjacent the skirt thereof to adjacent the apex thereof, whereby to provide a canopy having zones of local porosity which are a continuous function of the radial distance thereof from the apex of said canopy and such zones are of decreasing local porosity from the skirt of said canopy to the apex thereof.

3. A parachute canopy including a plurality of gores having radial tapes, the number of gores and radial tapes being in accordance with the size and structural requirements of the canopy, each gore including a plurality of spaced horizontal segments, said horizontal segments being spaced apart to provide a gore having a geometric porosity decreasing from adjacent the skirt of the canopy to adjacent the apex thereof, certain of said horizontal segments having a mechanical porosity greater than others, and said horizontal segments being disposed in zones of decreasing mechanical porosity from adjacent the skirt of said canopy to adjacent the apex thereof, whereby to provide a canopy gore having decreasing local porosity from skirt to apex which is a continuous function of the radial distance thereof from the apex.

References Cited

UNITED STATES PATENTS

| 2,358,582 | 9/1944 | Little | 244—145 |
| 3,173,636 | 3/1965 | Sepp | 244—145 |
| 3,240,451 | 3/1966 | Sepp | 244—145 |

OTHER REFERENCES

U.S. Air Force Parachute Handbook, December 1956, Section 1.3.2.

MILTON BUCHLER, *Primary Examiner.*

RICHARD A. DORNON, *Assistant Examiner.*